(12) United States Patent
Sibeykin

(10) Patent No.: US 6,240,435 B1
(45) Date of Patent: May 29, 2001

(54) METHOD AND DEVICE OF DETERMINATION OF AN INPUT SIGNAL WHICH CHANGES IN TIME

(76) Inventor: Sergei Sibeykin, 2302 81 St., Brooklyn, NY (US) 11214

( * ) Notice: Subject to any disclaimer, the term of this patent is extended or adjusted under 35 U.S.C. 154(b) by 0 days.

(21) Appl. No.: 09/084,340

(22) Filed: May 26, 1998

(51) Int. Cl.[7] .................................................. G06F 15/00
(52) U.S. Cl. .......................................... 708/444; 702/142
(58) Field of Search ..................................... 708/200, 433, 708/444, 290; 702/141, 142, 144, 146, 147

(56) References Cited

U.S. PATENT DOCUMENTS

| | | | | |
|---|---|---|---|---|
| 4,030,038 | * | 6/1977 | Daniel et al. | 327/339 |
| 5,031,134 | * | 7/1991 | Kaplan et al. | 708/444 |
| 5,490,067 | * | 2/1996 | Teguri et al. | 701/46 |
| 5,790,442 | * | 8/1998 | Ninomiya et al. | 708/444 |

* cited by examiner

*Primary Examiner*—Chuong Dinh Ngo
(74) *Attorney, Agent, or Firm*—I. Zborovsky

(57) ABSTRACT

A method of determination an input signal changed in time and its integral value has the steps of integrating an input signal to a given value of an integration result for a final point, and performing calculations also for a plurality of intermediate points.

2 Claims, 2 Drawing Sheets

METHOD AND DEVICE OF DETERMINATION OF AN INPUT SIGNAL WHICH CHANGES IN TIME

BACKGROUND OF THE INVENTION

Sensors convert nonelectrical physical or chemical quantities into electrical signals. The behavior of semiconductor sensor devices is modeled, under a series of assumptions, by a system of nonlinear partial differential equations and associated boundary and input value conditions. For such sensors, it is essential to solve numerically at least some of the equations in order to obtain a meaningful result describing environmental conditions encountered by the sensor. Mechanical sensors also suffer from some of the same issues relating to nonlinearity and associated boundary and initial value considerations.

When the desired result is determined by the integration of sensor output over time, errors of bias scale, and nonlinearity occur. Mathematical algorithms are used to improve the accuracy of the result by correcting for such errors of bias, scale and nonlinearity.

The present invention relates to methods and devices of determination of an input signal which changes in time as well as of its integral value.

Methods are known of the above mentioned general type and disclosed for example in Inventor's Certificates of the USSR 1,453,418 and 1,541,635. In accordance with the method and device disclosed in these references, integration is performed to a given value of the integration result. This objective is presented for example in inertia systems of targeting, for turning off an engine when a rocket reaches a desired speed $V_r$. The input signal in this case is an acceleration which is measured by accelerometer, and its inaccuracies are a main source of error of the system as a whole. The device includes a convertor 1 for a frequency of pulse sequence, a frequency multiplier 2, an integrator or pulse counter 3, a source of reference signals 4, keys 5 and a control device 7. A code corresponding to a desired value of speed is introduced into the pulse counter by integration of reference signals (accelerations) during a time corresponding time interval. The values of the reference signals can be obtained by turning a sensitivity axis of the accelerometer relative to a local vertical. Then, during measurements of the input signal which is the acceleration during a flight, an inverse integration is performed. In other words, the pulses from the convertor, multiplied many times by the frequency multiplier are deducted in the counter from the code obtained during the time of direct integration when the counter was operating for addition of the reference signals. A system of equations was used to determine the reference signals and time intervals. The nature of change of the input signal was approximately known beforehand, and therefore an initial moment of the input signal was calculated. Zeroing of the pulse counter is a signal that the speed reached the desired value. The above described method has a high accuracy. However, it has some disadvantages, namely the fact that the high accuracy is guaranteed in only one point and not along the whole scale of speed changes. This values must be known in order to determine of the location of a rocket. The known method and device are not always technically implementable since it is necessary that one reference signal is greater and the other is smaller than an average value of the input signal. However, the acceleration can reach a few g while on the ground during giving of the reference signals not always there is a standard of acceleration more than 1 g.

SUMMARY OF THE INVENTION

Accordingly, it is an object of present invention to provide a method and device which eliminates the disadvantages of the prior art.

In keeping with these objects and with others which will become apparent hereinafter, one feature of present invention resides, briefly stated, in a method of determination of an input signal changing in time, in which conversions which were performed for a final point in accordance with a known algorithm disclosed in the prior art, is also performed for final point $t_n$ for intermediate $t_1, t_2, t_k$ in accordance with a modified algorithm, so that it is possible to use not reference signals which are required by change curve of a changing acceleration, but reference signals which are available or in other words can be less than 1 g. The desired movement parameters are determined during the flight, and therefore a deviation of the acceleration curve from an expected acceleration curve does not reduce the accuracy.

In accordance with another feature of the present invention the device is provided with means for performing the above mentioned conversions for intermediate points as well.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

curve 1—actual speed curve 2—reading of speed without correction curve 3—reading of the speed using the known method, where the reference signals are introduced for the moment in time ($t_n$);

curve 4—reading of speed for the new method, where the reference signals are introduced for the intermediate moments in time ($t_1, t_2 \ldots t_n$)

Figure 1:
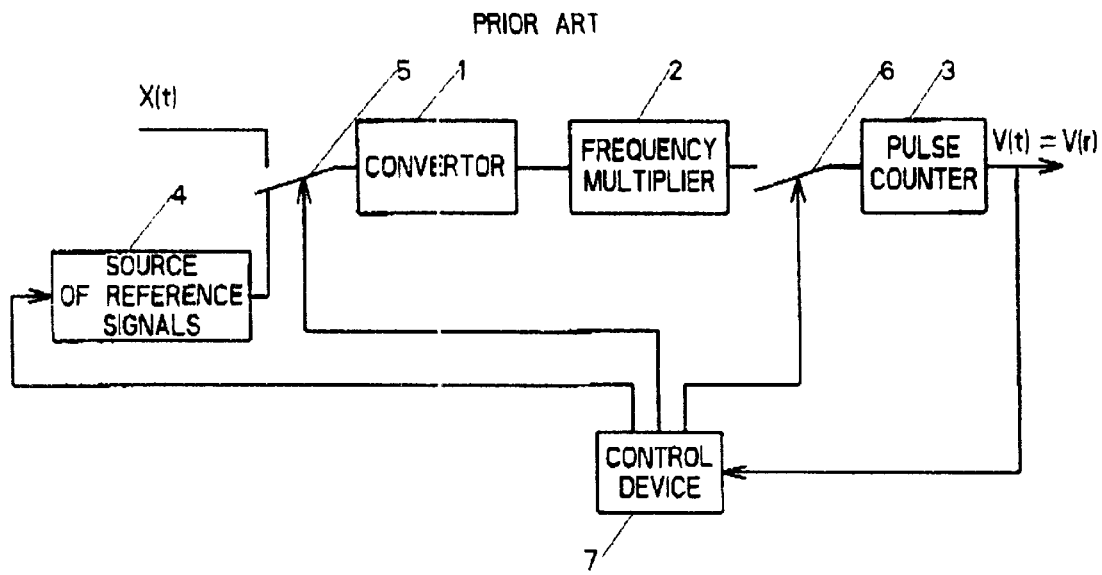
FIG. 1 is a view showing a device for determination of an input signal which changes in time in accordance with known method.
Figure 2:
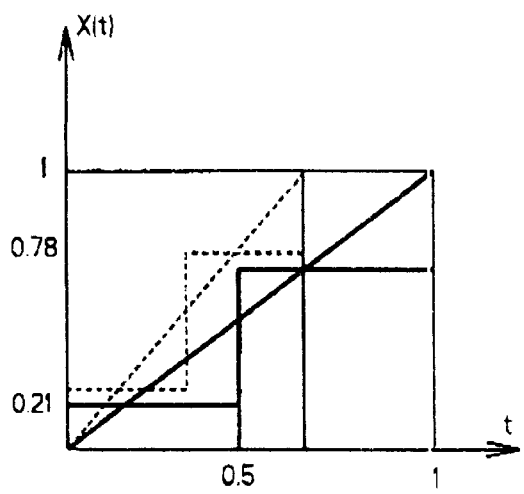
FIG. 2 shows a linear increase in input signals and an adjustment in the reference signals using the known method.
Figure 3:
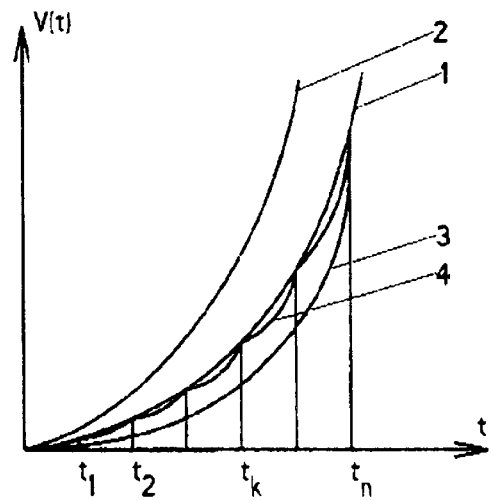
FIG. 3 graphically shows a changing speed over time where.
Figure 4:
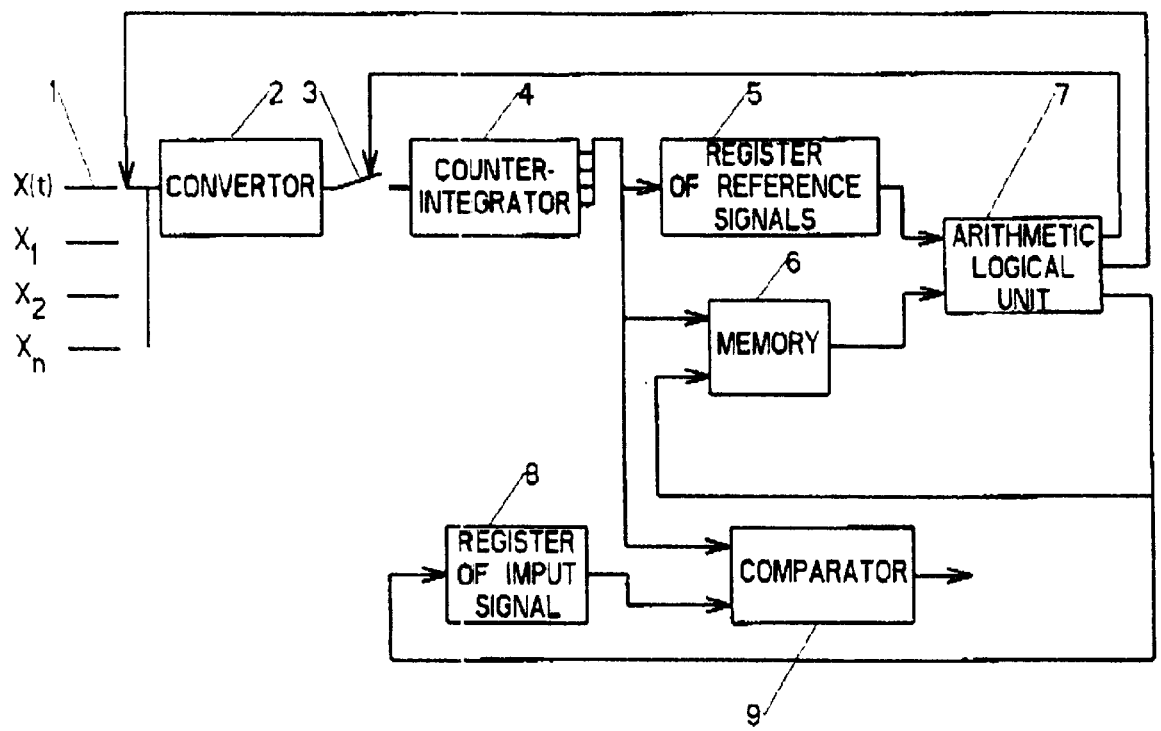

FIG. 4 is a view showing a device for the determination of an input signal which changes in time in accordance with the present invention.

DESCRIPTION OF PREFERRED EMBODIMENTS

In accordance with the present invention, the determination of an input signal which changes in time is performed with corresponding conversions for not only a final point, but also for intermediate points. For this purpose, a device includes a multi-position switch 1 through which an input signal x(t) and reference signal Xl, X2, . . . are supplied to several elements connected in series, in particular a convertor of analog into frequency 2, a key 3, a counter-integrator 4. The device further has a register unit of reference signals 5, a memory unit 6, and arithmetic-logical unit 7, a register of expected integral value of the input signal 8 and a digital comparetor 9.

Using the example of calculating the desired speed of a rocket prior to turning off the engine, the device operates in the following manner.

Before the beginning of measurements of an input signal, frequencies $f_1, f_2 \ldots$ of the convertor 2 which correspond to the reference signals $X_1, X_2, \ldots$ are determined. Then the arithmetic-logical device determines corresponding reading of accelerations $$y_i = \frac{f_i - f_o}{\beta_1},$$

where $f_0$ is a frequency of pulses of the convertor at a zero input signal;

$\beta_1$ is a coefficient of conversion of scale factor of the convertor 2. The scale factor is determined as $$B_1 = \frac{D_1}{D},$$

where $D_1$ and $D_2$ are determined as follows:

$$D = \begin{vmatrix} X_1 & X_1^2 & \ldots & X_1^n \\ X_2 & X_2^2 & \ldots & X_2^n \\ \vdots & \vdots & \ddots & \vdots \\ X_n & X_n^2 & \ldots & X_n^n \end{vmatrix} \quad D_1 = \begin{vmatrix} f_1 - f_0 & X_1^2 & \ldots & X_1^n \\ f_2 - f_0 & X_2^2 & \ldots & X_2^n \\ \vdots & \vdots & \ddots & \vdots \\ f_n - f_0 & X_n^2 & \ldots & X_n^n \end{vmatrix}$$

Also, coefficients of decomposition $d_i$ of a function $X=P(Y)$ of reverse characteristic of the input/out of the convertor 2 are determined and introduced into the memory unit 6. The values are determined by solving the following system of linear equations $$X_i = \sum_{j=1}^{n} d_j \cdot Y_i^j$$

This system of equation is solved through the determinators $$d_i = \frac{D_i}{D_d}$$

where $$D_d = \begin{vmatrix} Y_1 & Y_1^2 & Y_1^3 & \ldots & Y_1^n \\ Y_2 & Y_2^2 & Y_2^3 & \ldots & Y_1^n \\ \vdots & \vdots & \vdots & \ddots & \vdots \\ Y_n & Y_n^2 & Y_n^3 & \ldots & Y_n^n \end{vmatrix}$$

$$D_j = \begin{vmatrix} Y_1 & Y_1^2 & \ldots & Y_1^{j-1} & X_1 & Y_1^{j+1} & \ldots & Y_1^n \\ Y_2 & Y_2^2 & \ldots & Y_2^{j-1} & X_2 & Y_2^{j+1} & \ldots & Y_2^n \\ \vdots & \vdots & \ddots & \vdots & \vdots & \vdots & \ddots & \vdots \\ Y_n & Y_n^2 & \ldots & Y_n^{j+1} & X_n & Y_n^{j+1} & \ldots & Y_n^n \end{vmatrix}$$

At the beginning of the measurements, the acceleration $x(t)$ is supplied to the input of the convertor 2 and its pulse are counted by the counter 4. Periodically, from cycle to cycle, the code $N_k^1$ which is written in the pulse counter 4 where K is a number of cycle is written into the memory unit 6. The arithmetic-logical unit determines the difference $N_k = N_k^1 - N_o$, where $N_o$ is a code corresponding to the value of the zero reference signal. By dividing $N_k - N_{k-1}$ by $\beta_1$ the value $\Delta W$—is determined which is an increment of speed value. After this the arithmetic unit calculates the values $\Delta W^2$, $\Delta W^3$ and adds them with the results of the previous calculations stored in the memory unit 6. Therefore, the initial moments of indication Y of the input signal are determined:

$$M_1[y] = \frac{1}{t}\sum_{1}^{n} \Delta W_k; \quad M_2[y] = \frac{1}{t}\sum_{1}^{n} \Delta W_k^2; \ldots$$

Therefore, knowing the expected initial moments of input signal $M_1[y], M_2[y], \ldots$ are known, and the arithmetic logical unit calculates and rights in the memory unit 6 the expected initial moments of the input signal $$M_1[x] = d_1 M_1[y] + d_2 M_2[y] + d_3 M_3[y] + \ldots$$

$$M_2[x] = d_1^2 M_2[y] + 2d_1 d_2 M_3[y] + 2d_1 d_3 M_3[y] + \ldots$$

$$M_3[x] = d_1^3 M_3[y] + 3d_1^2 d_2 M_4[y] + 3d_1^2 d_3 M_5[y] + \ldots$$

$$M_n[x] = d_1^n M_n[y] + nd_1^{n-1} d_2 M_{n+1}[y] + nd_1^{n-1} d_3 M_{n+2}[y] +$$

Since this and subsequent calculations require time, it is not possible to obtain the measured values of speed exactly at the time t=T. However, it is necessary for example in the case when upon reaching of the given speed a command for turning off of the rocket engine is given. Therefore, knowing the speed and its increment in "k" and some subsequent cycles, expected values in a subsequent "k+1" cycle are determined by extrapolation.

Knowing the initial moments $M_i[x]$, from the linear system of equation $$\sum_{i=1}^{n} T_i \cdot X_i^m = T \cdot M_m[x]$$

where m=0,1,2 ... n–1 and T is an expected time of measurements, $T_i$ is determined by determinators $$T_i = \frac{\Delta_i}{\Delta} \cdot T$$

$$\Delta = \begin{vmatrix} 1 & 1 & \ldots & 1 \\ X_1 & X_2 & \ldots & X_n \\ X_1^2 & X_2^2 & \ldots & X_n \\ X_1^n & X_2^n & \ldots & X_n^n \end{vmatrix}$$

$$\Delta_i = \begin{vmatrix} 1 & 1 & \ldots & 1 & 1 & 1 & \ldots & 1 \\ X_1 & X_2 & \ldots & X & M_1[x] & X_{i+1} & \ldots & X_n \\ X_1^2 & X_2^2 & \ldots & X_{i-1}^2 & M_2[x] & X_{i+1}^2 & \ldots & X_n^2 \\ X_1^n & X_2^n & \ldots & X_{i-1}^n & M_n[x] & X_{i+1}^n & \ldots & X_n^n \end{vmatrix}$$

By calculating the value of $T_i$, it is possible to find the value of speed expected in the time T $$V(T) = \sum_{i=1}^{n} T_i \cdot X_i$$

and corresponding to the value W(T) code $$N_T = \sum_{i=1}^{n} T_i \cdot f_i$$

Which is written in the register 8 and compared by the digital comparitor 9 with the content of the counter 4. Coincidence of these two codes which is confirmed by triggering of the digital comparitor 9 indicates that the speed reached the value V(T).

Now the above described operations can be repeated for the subsequent cycle. The duration of the cycle $\Delta t_k = t_k - t_{k-1}$ is limited from below only by a needed time of calculations.

Knowing the value of speed $N_{k+1}$ N $V_k$ with a high accuracy in neighboring cycles, it is possible to find a cycle average value of acceleration or input signal.

$$X_k = \frac{V_{k+1} - V_k}{\Delta t_{k+1}}$$

Thus, with the use of the proposed method, it is possible to use as input not only acceleration but also the input signals of other physical nature (mechanical, radiant, magnetic, electrical, thermal, chemical, vibrational, etc).

It should be emphasized that in the algorithm $$\sum_{i=1}^{n} T_i \cdot X_i^m = T \cdot M_m[x]$$

the values of reference signals can be arbitrary. Therefore it is possible to select those values of the reference signals which are available. For example, for measurement of acceleration more than 1 g it is possible to select the reference signals whose values do not exceed 1 g.

1. A characteristic of the input-output of convertor is presented as a row as Macloren row $\beta_1$ $\beta_2$ $$f = f_o + B_1 X + B_2 X^2 + \ldots$$

The output parameter f is brought to the input parameter, or in other words it is expressed in units of the input parameter, by dividing $$\frac{f - f_o}{B_1} = X + \frac{B_2}{B_1} X^2 + \ldots$$

or $$y = x + \frac{B_2}{B_1} x^2 + \ldots$$

The value y is an reading x, which is different from it only by the inaccuracy value. In the same way the speed is determined $$v(t) = \int_o^t x(t) \cdot dt$$

and the speed reading $$w(t) = \int_o^t y(t) \cdot dt.$$

2. Since to the input of the convertor "n" reference signals are supplied, it is possible to determine "n" coefficients of the above presented row, while practically only one coefficient -$\beta_1$ is needed. There is the following system of equations:

$$f_1 = f_o + \beta_1 x_1 + \beta_2 x_1^2 + \ldots$$

$$f_2 = f_o + \beta_1 x_1 + \beta_2 x_1^2 + \ldots$$

From this system of equations the above mentioned determinators are found, and the value of $\beta_1$ is found.

3. The input signal acts in the (t) can be judged only by the output signal, or in other words by the value y. It is possible to directly compute initial moments of the output signal $M_i[y]$.

The output signal is caused by the input signal x[t], but mathematically it is possible to present a reverse function, or in other words the input signal as a function of the output signal. This function can be disintegrated in the Macloren row with the disintegration coefficient $d_i$. This disintegration formula is $x = d_1 \cdot y + d_2 y^2 + \ldots$ When "n" reference signals are available, the following can be written $$X_1 = d_1 Y_1 + d_2 Y_1^2 + \ldots$$

$$X_2 = d_1 Y_2 + d_2 Y_2^2 + \ldots$$

$$X_n = d_1 Y_n + d_2 Y_n^2 + \ldots$$

Since $X_i$ and $Y_i$ are known, the value di can be found. The system of equation is linear and it is determined by the above mentioned determinators. The value $d_i$ is found in accordance with the previously presented equation. Since Y is a value of X, $d_1$ is close to I but not always equal to Y.

4. Knowing the initial moments of the value y, it is possible to find initial moments of the value x. The following formulas are utilized for this purpose. The initial order of the moment of the power "m" is $$M_m[x] = \frac{1}{T} \int_o^T p(x) \cdot x^m \cdot dx$$

Where p(x) is a density of probability of x or $$M_m[x] = \frac{1}{T} \int_o^t x^m(t) \cdot dt.$$

Then the first initial moment or the mathematical expectation is $$M_1[x] = \frac{1}{T} \int_o^T (d_1 y + d_2 y^2 + d_3 y^3 +) dt =$$

$$\frac{1}{T} \left[ d_1 \int y \cdot dt + d_2 \int y^2 dt + d_3 \int y^3 dt + \ldots \right] M_1[x] =$$

$$d_1 M_1[y] + d_2 M_2[y] + d_3 M_3[y] + \ldots M_2[x] =$$

$$\frac{1}{T} \int_O^T (d_1 y + d_2 y^2 + y_3 y^3 +)^2 dt =$$

$$\frac{1}{T} \int_o^T (d_1^2 y^2 + 2 d_1 d_2 y^3 + d_2^2 y^4 + 2 d_1 d_3 y^4 + 2 d_2 d_3 y^5 + d_3^2 y^6) dt =$$

$$M_2[y] = d_1^2 M_2[y] +$$

$$(2 d_1 d_2 M_3[y] + (2 d_1 d_3 + d_2^2) M_4[y] + 2 d_2 d_3 M_5[y] + d_3^2 M_6[y])$$

where $d_1 \approx 1 \cdot d_2, d_3, \ldots$ characterized non linearity, and its product is a value of the upper order of the smallness which is neglectable. Then, finally the following is received $$M_2[x] = d_1^2 M_2[y] + 2 d_1 d_2 M_3[y] + 2 d_1 d_3 M_4[y] \ldots$$

Analogously, it is possible to obtain $$M_3[x]=d_1^3M_3[y]+3d_1^2d_2M_4[y]+3d_1^2d_3M_5[y]+\ldots$$

and in a common case $$M_n[x]=d_1^nM_n[y]+nd_1^{n-1}d_2M_{n+1[y]}+nd^{n-1}d_3M_{n+2}[y]$$

The system of equations $$\sum_{i=1}^{n} T_i X_i^m = T \cdot M_m[x]$$

is obtained from the previous system of equations, (USSR Inventor's Certificates 1,453,418; 1,547,635) but the maximum value "m" is not equal to 2n−1, but instead is equal to n−1, or in other words it is necessary to have twice the number of the previous signals. For the simple case of three reference signals the following can be written.

$$T_1+T_2+T_3=T$$

$$T_1X_1+T_2x_2+T_3x_3=T\cdot M_1[x]$$

$$T_1X_1^2+T_2x_2^2+T_3x_3^2=T\cdot M_2[y]$$

While the invention has been illustrated and described as embodied in method and device of determination of an input signal which changes in time, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for determination an input signal which changes in time and at its integral value containing n reference signals, comprising a multi-position switch through which the reference signals and the input signal are supplied to a convertor analog-frequency, a key, a counter; a unit of registration of reference signals; a memory unit; an arithmetic-logical unit; a register of expected integral value of the input signal; a digital comparator; arranged so that outputs of the counter are connected to inputs of the memory unit and unit of registration of the reference signals, outputs of the memory unit and the unit of registration of reference signals are connected to inputs of the arithmetic logical unit, digital outputs of the arithmetic logical units are connected with input of the memory block and the register of expected integral value of input signal, control outputs of the arithmetic logical unit are connected with control inputs of the key and multi-position switch, inputs of the digital comparator are connected to outputs of the counter and the register of the expected integral value of input signal, in which the arithmetic logical unit write a code equal to a sum of products of every time interval and frequency of the convertor analog-frequency, corresponding to the reference signal wherein the every time interval are obtained from an n equation system in accordance with power m in which a left part of each equation in a sum of products of the time interval $T_1$ by the corresponding reference signal in the power m and a right side of each equation is a product of time of determination of the input signal by its initial moment of the power m, when, wherein m changes from one equation to another equation in a sequence 0, 1, . . . n−1 and the digital comparator fixes reaching by an integral value or the input signal of a value which is equal to a sum of the products of the time interval by the corresponding value of the reference signal.

2. A method of determination an input signal changed in time and its integrated value, comprising the steps of integrating to the given magnitude n reference signals which have a same nature as the input signal, the times interval of the reference signals are determined from conditions of equality the product time of determination of an input signal by its initial moment power m=0,1 . . . n−1 and the sum of products the time interval of a every reference signal by its value in a power m; integrating an actual input signal over time; and determining the reaching of a given magnitude by an integrated value of the input signal by coincidence of a result of the integrating of n reference signals and a result of the integrating of the actual input signal.

\* \* \* \* \*